US005628056A

United States Patent [19]
Grysiewicz et al.

[11] Patent Number: 5,628,056
[45] Date of Patent: May 6, 1997

[54] APPARATUS FOR CONVERTING TV AUDIO SIGNALS FOR RECEPTION ON A NEARBY AM AND/OR FM RECEIVER

[75] Inventors: Edward S. Grysiewicz, Menlo Park; Alexander C. Pummer, Pleasanton, both of Calif.

[73] Assignee: Econologic Technologies, Menlo Park, Calif.

[21] Appl. No.: 368,553

[22] Filed: Jan. 4, 1995

Related U.S. Application Data

[63] Continuation-in-part of Ser. No. 249,895, May 26, 1994, abandoned.

[51] Int. Cl.$^6$ ............................................. H04B 1/38
[52] U.S. Cl. ............................................. 455/89; 455/90
[58] Field of Search .......................... 455/179.1, 180.1, 455/180.2, 180.3, 180.4, 186.2, 188.1, 188.2, 191.1, 197.1, 189.1, 42, 6.3, 66, 77, 82, 89, 92, 74, 95, 129, 289; 348/729, 734, 736, 737, 738

[56] References Cited

U.S. PATENT DOCUMENTS

| | | | |
|---|---|---|---|
| 3,259,689 | 7/1966 | Sienkiewicz | 455/191.1 |
| 3,835,384 | 9/1974 | Liff | 455/180.2 |
| 4,596,045 | 6/1986 | Maier | 455/189.1 |
| 4,661,993 | 4/1987 | Leland et al. | 455/129 |
| 5,317,403 | 5/1994 | Keenan | 455/185.1 |
| 5,339,117 | 8/1994 | Song et al. | 455/180.1 |
| 5,440,351 | 8/1995 | Ichino | 455/179.1 |

*Primary Examiner*—Reinhard J. Eisenzopf
*Assistant Examiner*—Marsha D. Banks-Harold
*Attorney, Agent, or Firm*—Edward M. Suden, Esq.

[57] ABSTRACT

A television frequency-to-radio frequency transceiver is provided for receiving television audio signals via the airwaves and converting them to AM or FM radio frequency signals for transmission by the airwaves to a nearby AM or FM receiver. An antenna matching circuit and bandpass filter network are provided to enhance reception of signals in the lower VHF band. Selectable TV channels and selectable AM and FM radio frequencies are provided by means of digitally controlled television and AM and FM radio frequency synthesizers. Stereo signal processing and secondary audio programming signal processing are also provided. An external whip antenna is used for receiving signals and an internal loop antenna is used for transmitting the signals.

21 Claims, 6 Drawing Sheets

APPARATUS FOR CONVERTING TV AUDIO SIGNALS FOR RECEPTION ON A NEARBY AM AND/OR FM RECEIVER

This is a continuation in part patent application of a parent patent application, Ser. No. 08/249,895, now abandoned filed May 26, 1994 and assigned to the same assignee of the parent patent application.

BACKGROUND OF THE INVENTION

1. Field of the Invention

The present invention relates to apparatus for converting television program audio signals received via the airwaves for transmission via the airwaves to a nearby AM and/or FM receiver.

2. Description of the Related Art

The present invention relates to apparatus for receiving and converting the sound portion of conventional commercial television signals received via the airwaves into signals suitable for transmission via the airwaves for reception by nearby conventional AM and/or FM radio signal receiving apparatus.

Television audio signal converters have heretofore been proposed, illustrative of which are those disclosed in U.S. Pat. No. 4,905,303 which was granted to Johnson, Jr. et al. on Feb. 27, 1990 and U.S. Pat. No. 4,021,737 which was granted to Burdick S. Trask on May 3, 1977.

The earlier Trask patent discloses an apparatus which, when placed near a TV set, detects secondary radiation from the audio IF portion of the television, converts the detected signals to an FM radio signal, and transmits the FM signal for reception by a local radio.

A principle disadvantage of the Trask apparatus is the necessity that it be closely coupled to an operating TV receiver which greatly restricts the range of its usefulness and that in order to change the program that a user desires to listen to it is necessary to change the channel in the TV receiver.

The Johnson, Jr. et al. patent discloses a circuit for receiving an on-air TV signal, and converting the audio portion of the signal into an FM signal which is connected by any suitable connector to the antenna input terminals of a conventional FM receiver.

A principal disadvantage of the apparatus of Johnson, Jr. et al. is that it must be connected by a connector to the antenna terminals of an operable FM receiver thereby requiring special wiring, inconvenient antenna connections and the like. Such requirements necessarily limit the number and type of receivers with which the apparatus can be readily used and consequently significantly restrict the range of its usefulness. Furthermore, Johnson, Jr. et al. do not provide any user operable means for changing the frequency of the signal connectors to the antenna terminals of the FM receiver.

SUMMARY OF THE INVENTION

An object of the invention is a low-power transceiver for receiving television audio signals via the airwaves and converting them to FM radio frequency signals for transmission via the airwaves to a nearby AM and/or FM radio.

Another object of the invention is an apparatus for receiving and transmitting under user control either monaural or stereo signals.

Still another object of the invention is an apparatus for receiving and transmitting the primary audio portion of conventional monaural or stereo TV signals as well as the secondary audio program (SAP) signals which are carried on one or more audio subcarriers.

Another object of the present invention is an apparatus which, when suitably modified, is usable with other known television standards including PAL or SECAM.

Another object of the present invention is an apparatus comprising an extendable four-inch whip antenna for receiving TV audio signals and an internal loop antenna for transmitting FM signals.

Another object of the present invention is an apparatus comprising frequency synthesizers for digitally tuning selected TV channels and AM or FM stations.

Finally another object of the present invention is an apparatus comprising a receiver and transmitter which are housed in the same enclosure where the enclosure has a height of approximately four inches, a width of approximately three includes and a thickness of approximately one inch.

The apparatus of the present invention is a cross between a television set receiver but without the video, and a low power AM and/or FM radio transmitter. The unit, about the size of a garage door opener, contains all of the state-of-the-art components required to process every on-air television broadcast in a local area. Internally, the unit converts the audio portion of a user selected television channel to an unoccupied user selectable radio station frequency and broadcasts the signal using its own built-in low power transmitter.

This user selected radio frequency, now encoded with television audio information, is received and processed by any nearby, e.g. 10 feet to 15 feet, AM and/or FM radio receiver. The user simply tunes the radio to the frequency that is identical to that transmitted by the unit. All other receiver functions, e.g., volume, base, treble, etc., operate as designed by the radio's manufacturer. For convenience, the apparatus of the present invention is also provided with a means for allowing the user to store and select a limited number, e.g. five, of "favorite" channels.

In addition to receiving and transmitting the primary audio portion of conventional TV signals, an embodiment of the apparatus of the present invention is also capable of receiving and transmitting under user control the secondary audio program (SAP) signals which are carried on one or more audio subcarriers.

The various embodiments of the present invention are usable with all known television standards including NTSC used in the United States and Japan, PAL used in Europe and SECAM used in France.

From the foregoing it can be seen that the apparatus of the present invention provides its user with the opportunity to listen to his or her favorite television entertainment and news programs when there is no television set to watch. The unit will work with any car radio, personal portable headset or pocket radio, table-top radio, home stereo, or any other similar unit and may be carried or placed in any convenient location, e.g. shirt pocket, clipped to a belt, laid on a table, dashboard of an automobile, or the like. Moreover, the apparatus of the present invention will permit a user to privately listen to a television program while watching the video in cases where the audio of the television set is inaudible or muted.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

Figure 1A:
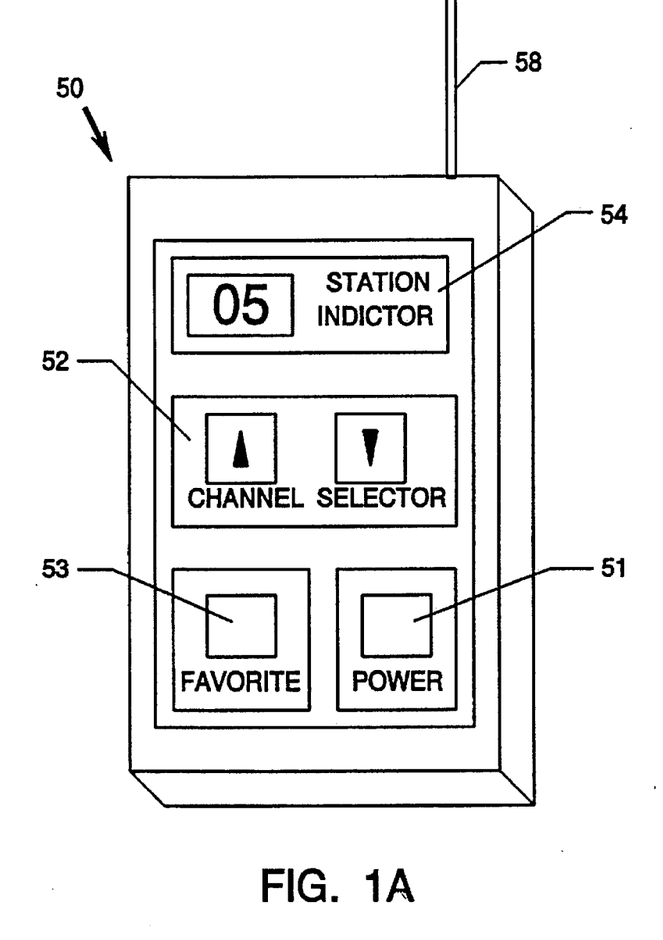
FIGS. 1A and 1B are top and side plan views of an apparatus for converting television audio signals received via the airwaves for transmission via the airwaves and reception on a nearby conventional AM and/or FM radio receiver according to the present invention.
Figure 1B:
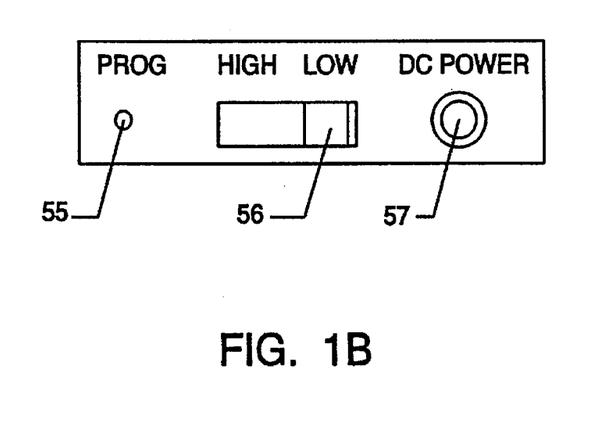

Referring to FIGS. 1A and 1B, there is provided in accordance with the present invention an apparatus designated generally as 50 for converting television audio signals received from the airwaves for transmission via the airwaves and reception on a nearby AM and/or FM receiver. On the front of the apparatus 50 there is provided a power on/off switch 51, an up/down channel selector switch 52 for enabling a user to select one from among all channels in a local area, a favorite channel selector switch 53 for enabling a user to select a limited number of channels, e.g. five, which the user has stored and a station indicator 54 for displaying the television channel which has been selected.

On a side of the apparatus 50 as shown in FIG. 1B there are also provided a programming switch pin hole 55 to enable a user to select a frequency on an AM and/or FM receiver which is also displayed by the station indicator 54, a high/low transmit power switch 56, an external d-c power jack 57 and, in certain embodiments, a SAP switch (not shown) to enable a user to select between primary and secondary audio programs as will be described below.

The apparatus 50 is shown with an antenna 58 partially extended.

Figure 2:
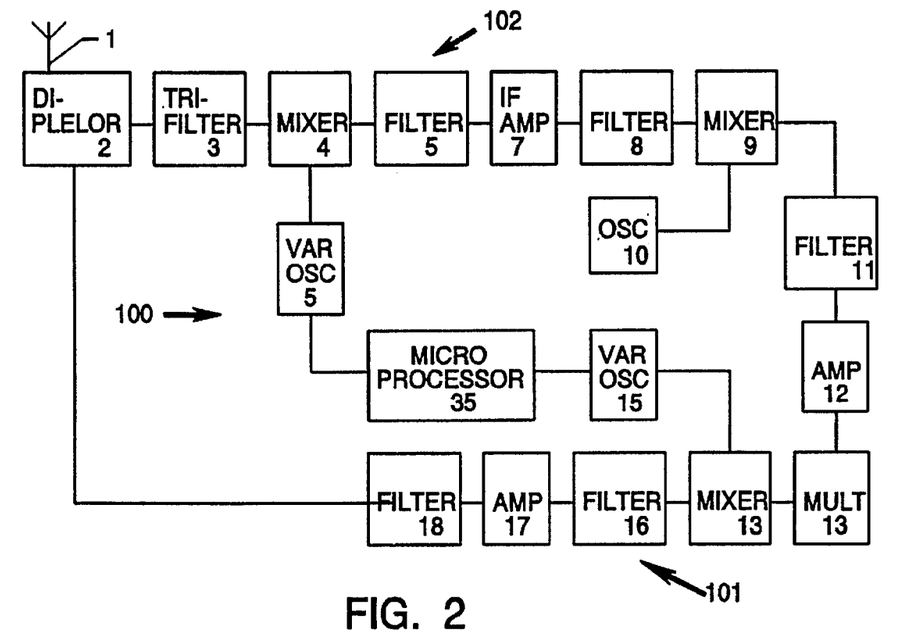
FIG. 2 is a block diagram of an embodiment of the present invention for converting the audio component of television signals comprising NTSC and PAL television standards to an FM output.

Referring to FIG. 2, there is provided in accordance with the present invention an apparatus designated generally as 100 which may be used in the apparatus 50 of FIG. 1 for converting the frequency modulated audio component exclusive of the video component of a television signal received via the airwaves comprising NTSC and PAL television standards to a conventional frequency modulated radio carrier signal and transmitting the frequency modulated carrier signal via the airwaves to a nearby conventional frequency modulated radio signal receiving apparatus.

In the apparatus 100 there is provided an antenna 1 which is common to both the transmitting and receiving sections of the apparatus. The transmitting section is designated generally as 101 and the receiving section is designated generally as 102. Coupled to the antenna 1 there is provided a diplexer 2. The diplexer 2 prevents the output of the transmitter 101 of the apparatus 100 from overlapping the receiver 102 while connecting both the transmitter 101 and the receiver 102 to the antenna 1, as will be further described below. Coupled to an output of the diplexer 2 there is provided a preselection circuit 3. The preselection circuit 3 comprises essentially three bandpass filters for selectively passing the frequencies associated with channel 2–6, channels 7–14 and channels 15–71 and thereby improve the selectivity of the receiver. Coupled to the output of the preselection circuit 3 there is provided a first mixer 4 and a synthesized, user tunable first local oscillator 5 for selecting the audio component of a selected channel exclusive of the video component thereof. The frequency of the input to the first mixer 4 is designated $F_{IN}$. The frequency of the output of the local oscillator 5 is designated $F_{LO1}$. The output of the first mixer 4 comprises a first intermediate frequency $IF_1$, wherein $IF_1 = F_{IN} \pm F_{LO1}$.

Coupled to the output of the mixer 4 there is provided a first intermediate frequency filter 6 having a center frequency $F_{C1}$, wherein $F_{C1} = F_{IN} + F_{LO1}$.

In a preferred embodiment of the present invention, to avoid the requirement for a synchronously tuned input filter, a high $F_{LO1}$, e.g. greater than 800 Mhz, and a filter 6 having a bandwidth of 15 MHz and a center frequency $F_{C1}$ of 930 MHz are used to select the higher of the two mixing products to provide a first intermediate frequency $IF_1$ of approximately 930 MHz. The use of a high first intermediate frequency is found to eliminate problems with image frequencies.

Coupled to the output of the IF filter 6 there is provided a first IF amplifier 7. Amplifier 7 is provided to increase the level of the IF signal received from the filter 6 to improve the signal-to-noise ratio and system sensitivity. Coupled to the output of the amplifier 7 there is provided a second intermediate frequency filter 8 having a bandwidth of 300 KHz and a center frequency $F_{C2}$, wherein $F_{C2} = F_{C1}$. Filter 8 is provided to significantly improve the selectivity of the first IF system by increasing the attenuation of the signals outside the passbands of the two filters.

Coupled to the output of the second intermediate frequency filter 8 there is provided a second mixer 9 and a second local oscillator 10 having a frequency $F_{LO2}$ of approximately 923.5 MHz. Mixer 9 and second local oscillator 10 cooperate with the output of the second filter 8 to provide a second intermediate frequency $IF_2$, wherein $IF_2 = IF_1 \pm F_{LO2}$. The second local oscillator 10 comprises a fixed frequency phase lock loop.

Coupled to the output of the mixer 9 there is provided a third intermediate frequency filter 11 having a bandwidth of 300 KHz and a center frequency $F_{C3}$, wherein $F_{C3}=IF_2-F_{LO2}$, e.g. 6.5 MHz. The second intermediate frequency filter 11 establishes the adjacent channel selectivity of the system.

The output of the filter 11 is coupled to a limiter amplifier 12. The limiter amplifier 12 provides a constant amplitude signal for a frequency multiplier 13 coupled to the output thereof in the transmitter section 101.

The frequency multiplier 13, which increases the frequency of the signal applied thereto by a factor of N, e.g. 2, enhances the signal-to-noise ratio of the television audio channel by carrier frequency (and deviation) multiplication. Coupled to the output of the frequency multiplier 13 there is provided a transmit mixer 14 for providing a third intermediate frequency $IF_3$ and a transmit auxiliary third local user tunable oscillator 15 for providing an output frequency $F_{LO3}$, wherein $IF_3=N\times F_{C3}\pm F_{LO3}$.

Coupled to the output of the mixer 14 there is provided a fourth intermediate frequency bandpass filter 16 having a frequency $F_{C4}$ in the range of 88 MHz to 108 MHz, depending on the third local oscillator frequency $FLO_3$. Coupled to the output of the filter 16 there is provided a transmitter output amplifier 17 for increasing the level of the transmit signal. Coupled to the output of the amplifier 17 there is provided a fifth intermediate frequency filter 18 having a frequency $F_{C5}$ for removing undesired harmonics from the output spectrum, wherein $F_{C5}=F_{C4}$.

In operation, a person using the controls/switches of the apparatus 50 (FIG. 1) controls the microprocessors (μp) 35 to set the frequencies of the local oscillators 5 and 15 thereby selecting the desired channel and the frequency at which the audio will be broadcast to an FM receiver.

Figure 3:
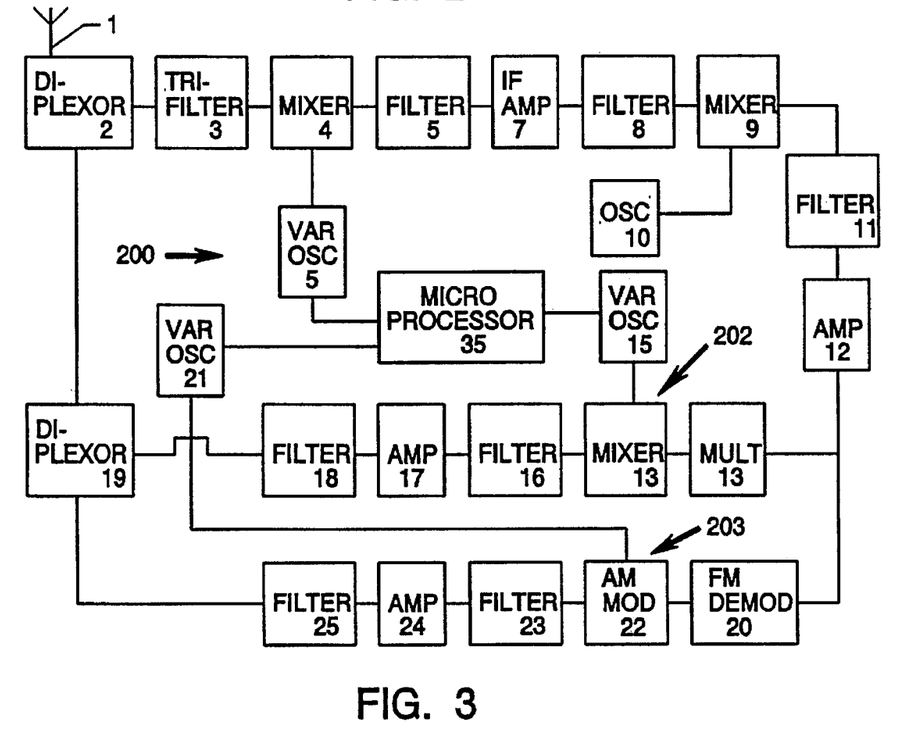
FIG. 3 is a block diagram of another embodiment of the present invention for converting the audio component of television signals comprising NTSC and PAL television standards to either an AM or FM output.

Referring to FIG. 3, there is provided in an alternative embodiment of the present invention an apparatus designated generally as 200 having a receiver section designated generally as 201, an FM transmitter section designated generally as 202 and an AM transmitter section designated generally as 203 for processing television signals comprising NTSC and PAL television standards.

The majority of the components in the apparatus 200 are described above with respect to the apparatus 100 of FIG. 2, are identical in structure and function, and therefore bear the same numerical designation and require no further description. The only additional components not described above with respect to the apparatus of FIG. 2 are components designated 19–25, as hereinafter described.

At the output of the transmitter output filter 18 in the FM transmitter section 202 there is provided an AM/FM diplexer 19. Coupled to the output of the limiter amplifier 12 in the receiver section 201 there is provided an FM demodulator 20. In the AM transmitter section 203 of the apparatus 200 shown at the bottom of FIG. 3, there is provided a user tunable AM transmit oscillator 21 which is tunable over a frequency range of from 1 MHz to 1.7 MHz. One input of an AM modulator 22 is coupled to the oscillator 21 and the other input to an output of the FM demodulator 20. The output of the AM modulator 22 is coupled to a harmonic filter 23 having a bandwidth of 700 KHz from 1.0 MHz to 1.7 MHz and a center frequency $F_{C6}$, e.g. 1300 KHz for suppressing undesired harmonics from the AM modulator 22. The output of the harmonic filter 23 is coupled to an AM output amplifier 24 which is, in turn, coupled to an AM output filter 25 having a bandwidth of 700 KHz and a center frequency $F_{C7}$, wherein $F_{C7}=F_{C6}$. The output of the AM filter 25 is coupled to a second input of the AM/FM diplexer 19 which, as indicated above, has an output coupled to the diplexer 2 leading to the antenna 1 for transmitting either an AM or an FM modulated carrier.

Diplexer 19, like diplexer 2, prevents the overloading of the receiver input with the output from the transmitters using conventional passive circuit elements.

Figure 4:
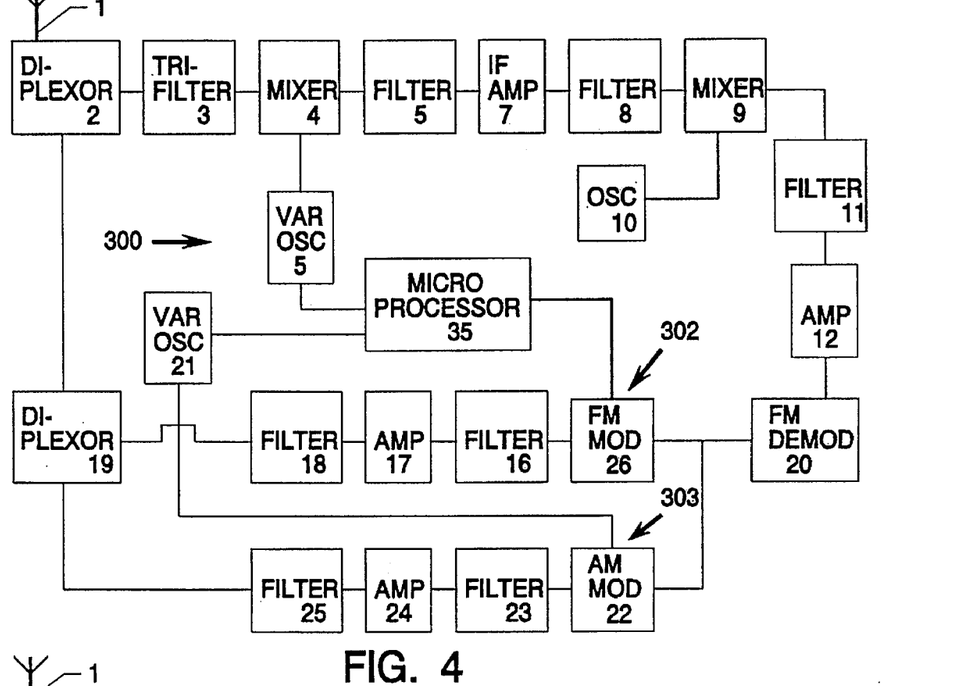
FIG. 4 is a block diagram of still another embodiment of the present invention for converting the audio component of television signals comprising NTSC and PAL television standards to either an AM or FM output.

Referring to FIG. 4, there is provided in still another embodiment of the present invention an apparatus designated generally as 300 having a receiver section designated generally as 301, an FM transmitter section designated generally as 302 and an AM transmitter section designated generally as 303. The apparatus 300 is provided for processing television signals comprising NTSC and PAL television standards The majority of the components in the apparatus 300 are described above with respect to the apparatus 200 of FIG. 3, are identical in structure and function, and therefore bear the same numerical designation and require no further description. The only additional component not described above with respect to the apparatus of FIG. 3 is the component designated 26, as hereinafter described.

In the apparatus 300 the baseband audio signal at the output of the receiver's FM demodulator 20 is available and coupled to both an FM modulator 26 and the AM modulator 22 which are, in turn, coupled to the antenna 1 via the diplexers 19 and 2. The FM modulator 26 comprises a tunable oscillator the nominal center frequency of which is set by the user via the microprocessor 35 and modulated by the output of the FM demodulator 20.

Figure 5:
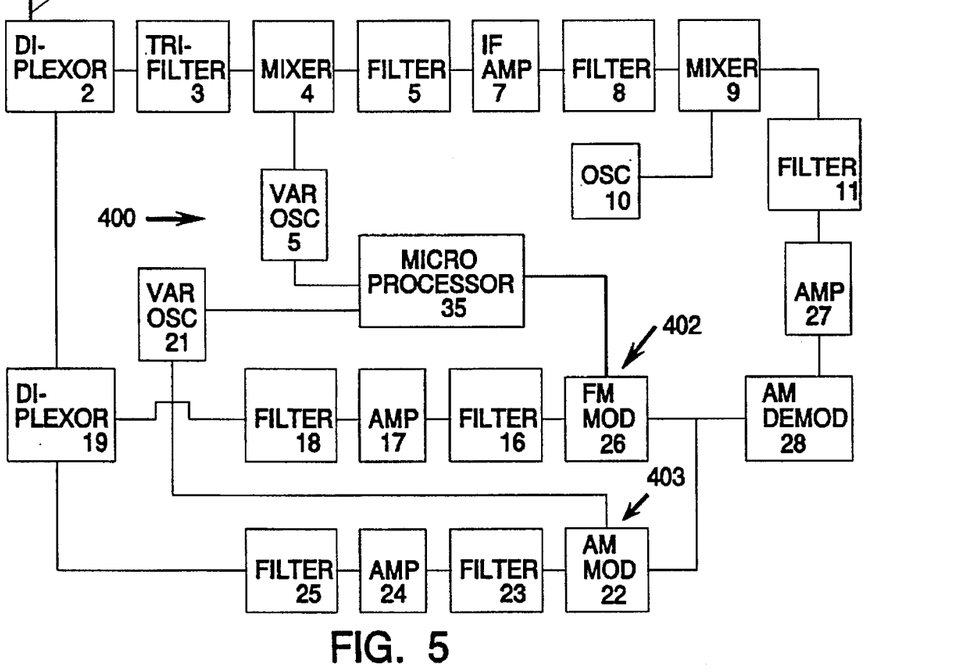
FIG. 5 is a block diagram of still another embodiment of the present invention for converting the audio component of television signals comprising SECAM television standards to either an AM or FM output.

Referring to FIG. 5, there is provided in still another embodiment of the present invention an apparatus designated generally as 400 for processing television signals comprising SECAM television standards. The apparatus 400 of FIG. 5 is identical to the apparatus 300 of FIG. 4 except that the amplifier 12 and demodulator 20 in the receiver section 301 of the apparatus 300 of FIG. 4 is replaced by a gain controlled second IF amplifier 27 and an AM demodulator 28, respectively, for providing via the diplexers 19 and 2 either an AM or an FM modulated carrier signal to the antenna 1.

Conventional television channels comprise a primary audio program component and may comprise one or more secondary audio program (SAP) components. If a television channel carries one or more secondary audio program components, they are carried on a corresponding number of subcarriers in the primary or first audio channel.

Figure 6:
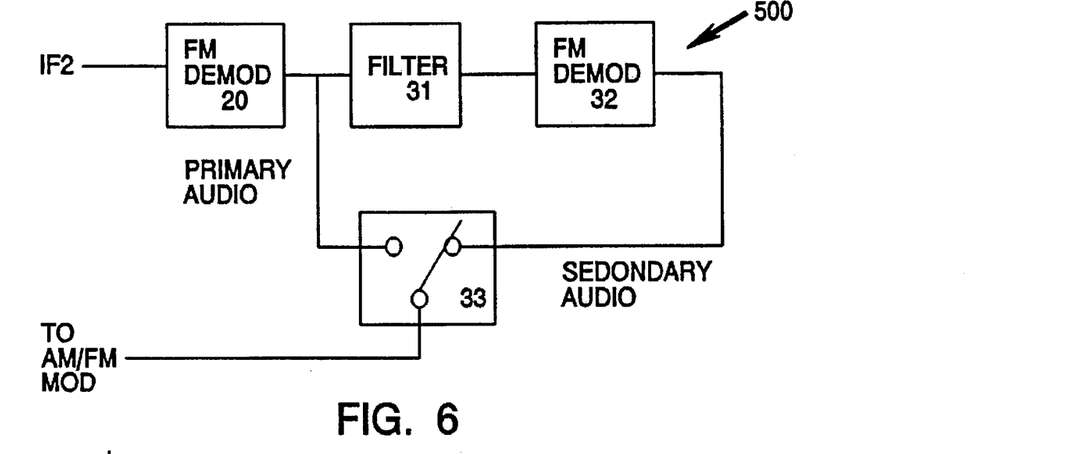
FIG. 6 is a block diagram of a circuit for processing the secondary audio program (SAP) signals of a television channel.
Figure 7:
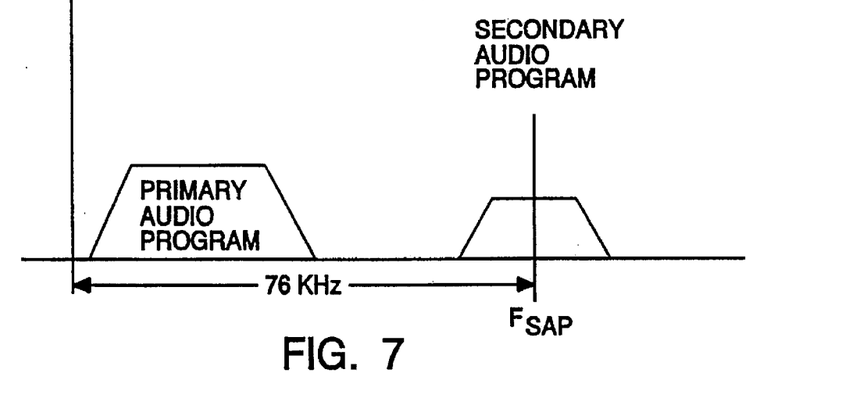
FIG. 7 is a graphical representation of the relationship between the primary and secondary audio portions of a television channel.

Referring to FIGS. 6 and 7, there is provided in accordance with another embodiment of the present invention an apparatus for selectively providing the primary and secondary audio components in a television channel designated generally as 500.

The apparatus 500 is coupled to the output of the FM demodulator 20 described above with respect to the apparatus of FIGS. 3 and 4. In the apparatus 500 there is provided a bandpass filter 31 having a center frequency of approximately 76 KHz. The output of the filter 31 is coupled to a second FM demodulator 32. Coupled to the output of the FM demodulator 20 and the FM demodulator 32 there is provided a switch means 33. The switch means 33 is provided for selectively coupling either the primary audio program component or the secondary audio program component to the AM and/or FM modulators described above with respect to FIGS. 3 and 4.

In practice, the secondary audio program component subcarrier is carried on a subcarrier situated in the first audio channel and has a center frequency which is above the low end of the first audio program component by approximately five times the horizontal deflection frequency, e.g. equal to the desired subcarrier frequency, e.g. 76 KHz.

In each of the above-described embodiments of the present invention a suitably programmed microprocessor 35 and user operable controls, e.g. switches 52 and 53 as shown in FIG. 1, are provided for permitting a user to control the frequency of the various oscillators required to select a particular television channel and an unoccupied frequency in the AM and/or FM radio frequency band. In the case of setting the radio frequency, a control similar to that used for setting a digital watch may be used since it should be necessary to set the frequency only once in any given locale for a long period of time. A small battery is used to store the frequency for the long period of time while larger batteries that may have to be replaced more frequently are used to supply power to the remainder of the apparatus.

Figures 8, 9, 12:
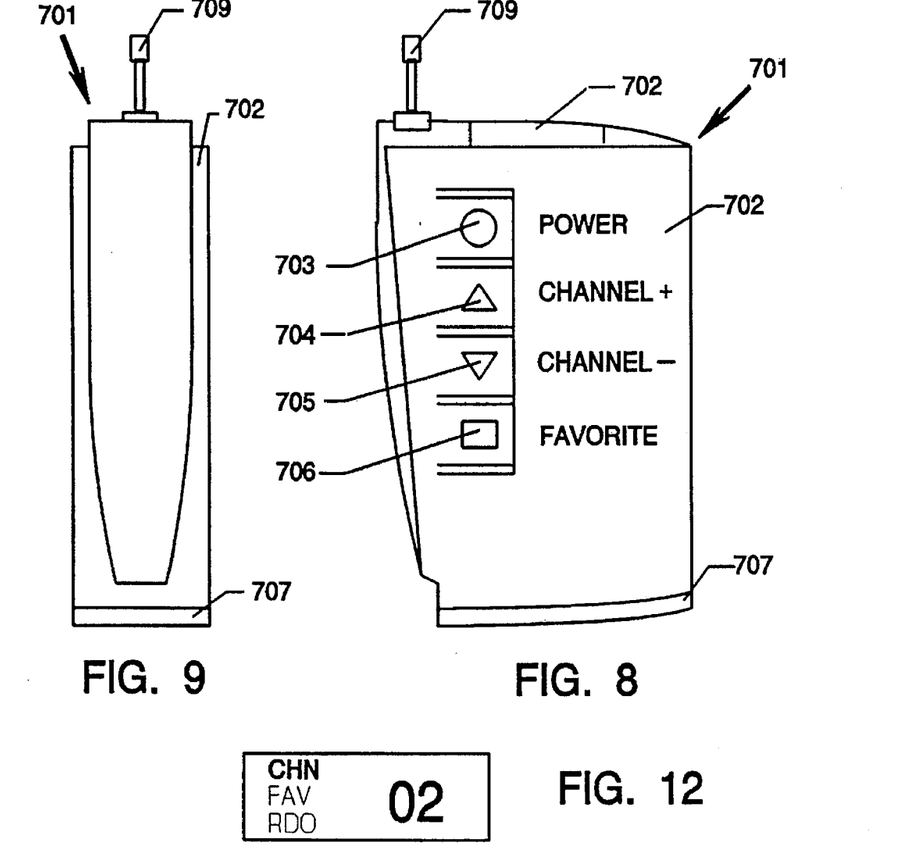
FIG. 8 is an elevation view of another transceiver according to the present invention.
FIG. 9 is a side elevation view of the transceiver of FIG. 8.
FIGS. 12, 13 and 14 are plan views of the LCD display window of FIG. 10.
Figure 10:
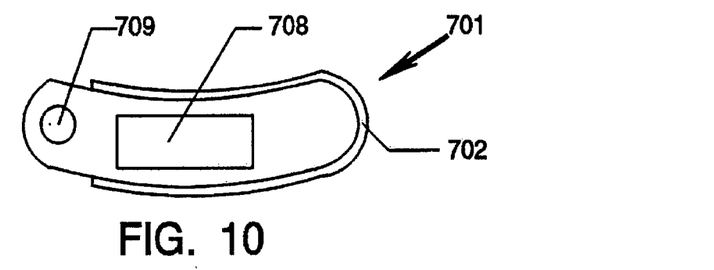
FIG. 10 is a plan view of the top of the transceiver of FIG. 8.

Referring to FIGS. 8, 9 and 10, there is provided in accordance with the present invention another television audio signal-to-radio frequency transceiver designated generally as 701. In the transceiver 701 there is provided a housing 702. The rear of the housing 702 is concave and the front of the housing 702 is convex for comfort in carrying the transceiver 701 in a pocket or on a belt. At the front of the housing 702 there is provided a power-on/off key 703, an up-channel (+) key 704, a down-channel (−) key 705 and a favorite channel key 706, the operation of which will be described in detail below. At the bottom of the housing 702 there is provided a battery compartment 707 for holding two AA batteries and a conventional power input jack (not shown) for coupling the transceiver 701 to an external source of power, e.g. automobile cigar/cigarette lighter. At the top of the housing 702 there is provided a liquid crystal display 708. To the left of the display 708 there is provided an extendable antenna 709. When fully extended the antenna 709, which comprises a flexible whip antenna, is about four inches long. Overall, the housing 702 is approximately four inches tall, three inches wide and about 1 inch thick.

Figure 11:
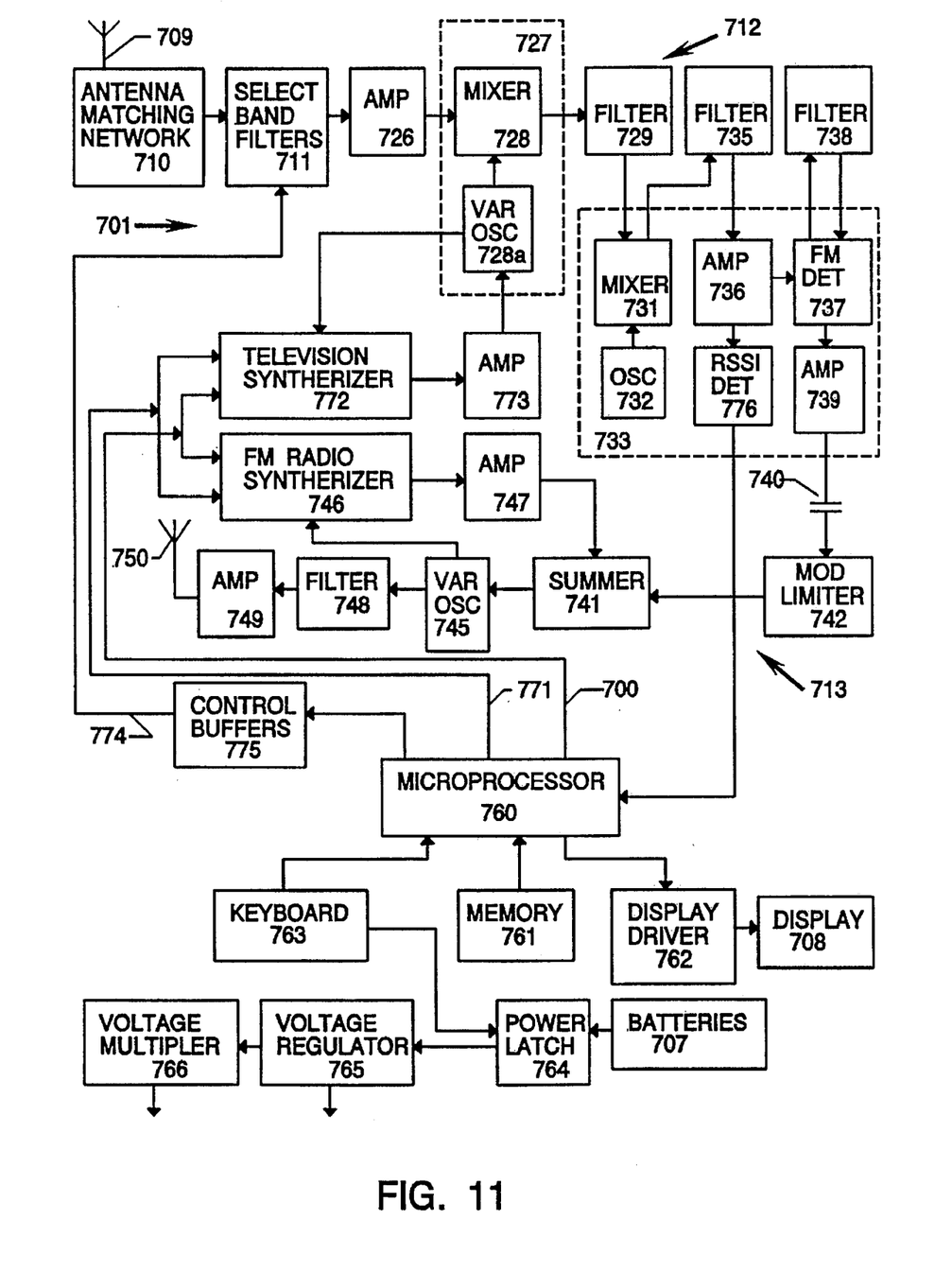
FIG. 11 is a block diagram of the transceiver of FIGS. 8, 9 and 10.

Referring to FIG. 11, the transceiver 701 comprises a TV audio signal receiver section designated generally as 712 and an FM transmitter section designated generally as 713. When fully extended the external whip antenna 709 in the receiver section 712 is electrically connected in series to a antenna matching network 710 and a selectable three-band bandpass filter network 711. At other times, the antenna 709 is inductively coupled to the antenna matching network 710. The output of the antenna matching network 710 is connected a selectable three-band bandpass filter network 711, the output of which is connected to the input of pre-amplifier 726. The output of the amplifier 726 is coupled to a mixing circuit and local oscillator assembly designated generally as 727 comprising a mixer 728 and a local oscillator 728a. As will be described further below, the oscillator 728a is provided for generating three bands of frequencies depending upon the frequency of the input signal so as to provide at the output of the mixer 728 a first intermediate frequency IF1 of 41.25 MHz which will contain the audio information in each of the channels received. The three bands of frequencies comprise 101–129 MHz, 221–257 MHz and 517–847 MHz which correspond, respectively, to the audio frequencies in the three band of transmitted television frequencies, that is the VHF-L band of channels 2–6 in the frequency range of 54 MHz to 88 MHz, the VHF-H band of channels 7–13 in the frequency range of 174 MHz to 216 MHz and the UHF band of channels 14–83 in the frequency range of 470 MHz to 806 MHz. For example, channel 2 comprises frequencies in the band 54 MHz to 60 MHz. In each of the channels the audio information is carried at a frequency centered 250 KHz or 0.25 MHz below the upper end of the band. Accordingly, in channel 2 the audio information is centered at 59.75 MHz or 41.25 MHz below 101 MHz.

Coupled to the output of the mixer 728 there is provided a first intermediate frequency bandpass filter 729 having a center frequency at 41.25 MHz. The output of the bandpass filter 729 is coupled to an integrated circuit designated generally as 733, such as a Phillips SA626 comprising a second mixer 731 and local oscillator 732, an amplifier 736, a quadrature detector 737 and an amplifier 739. The output of the mixer 731 is a second intermediate frequency IF2 of 10.7 MHz. The frequency of the oscillator 732 is 30.55 MHz. Coupled to the output of the mixer 731 there is provided a second intermediate frequency bandpass filter 735 having a bandwidth of approximately 125 KHz and a center frequency of 10.7 MHz. Coupled to the output of the filter 735 there is provided the amplifier 736. Coupled to the output of the amplifier 736 there is provided the quadrature FM detector 737. Coupled to the detector 737 there is provided a quadrature resonator 738 which comprises a parallel resonant RLC circuit. Resonator 738 and detector 737 cooperate to provide at the output of the detector 737 a baseband signal comprising the desired audio signal. The baseband signal comprises a variable d-c output, the magnitude of which increases as the frequency of the input to the quadrature detector increases and decreases as the frequency of the input to the quadrature detector decreases. The baseband signal at the output of the quadrature detector 737 is then applied to the amplifier 739.

The output of the amplifier 739 is coupled to the transmitter section 712 of the transceiver 701 by means of a d-c blocking capacitor 740.

In the transmitter section 713 the signal from the capacitor 740 is coupled to one input of a summing circuit 741 by means of a modulation limiter 742. Modulation limiter 742 prevents noise, such as switching transients, from overdriving the transmitter section 713 which would otherwise cause interference with adjacent FM channels.

The summing circuit 741 is part of a loop comprising a local oscillator 745, an FM radio frequency synthesizer 746 and an amplifier 747. The oscillator 745 operates in conjunction with the FM radio frequency synthesizer 746 and the summing circuit 741 to provide an output frequency which is half the user selected FM transmission frequency. The speed of the loop comprising the synthesizer 746 is relatively slow, i.e. limited to tracking signals having a frequency of approximately 1 Hz, so that the frequency of oscillator 745 will vary as a function of the input audio baseband signal about a center frequency which is maintained at one half the selected frequency in the FM band.

Coupled to the output of the oscillator 745 there is provided a bandpass filter 748 for filtering the second harmonics in the output of the oscillator 745 within the band of frequencies 88–108 MHz. The output of the filter 748 comprises an FM modulated signal having a nominal center frequency within the FM radio frequency band of 88–108 MHz and a peak deviation of 75 KHz. Coupled to the output of the filter 748 there is provided an amplifier 749. Coupled to the output of the amplifier 749 there is provided an internal loop antenna 750. As distinguished from the external whip antenna 709 which is responsive mostly to electrical field signals, the internal loop antenna 750 which is coupled to internal ground preferentially radiates mostly magnetic fields providing a desirable degree of isolation between the received signals on the whip antenna 709 and the transmitted signals on the loop antenna 750.

The operation of the transceiver 702 is under the control of a programmed CMOS microprocessor designated generally as 760. The microprocessor 760 is coupled to a nonvolatile memory 761, a display driver 762, a television frequency synthesizer 772, the FM radio frequency synthesizer 746, a keyboard 763, a control buffer circuit 775, and a RSSI detector circuit 776 which is used to control a channel seeking mode as described below. The control buffer circuit 775 is used to selectively apply ±5 volts via a control bus 774 to the selectable three-band bandpass filter network 711 under the control of the channel selection from the keyboard 63 so as to indicate which one of the three TV frequency bands has been selected and apply the correct bandpass filter in the received. The antenna matching network 710 in a similar manner (not shown) may be adaptive so as to modify the antenna matching characteristics of the antenna matching network 710 as a function of the band in which the channel being select resides. The display driver 762 is provided for driving the display 708 described above with respect to FIGS. 8, 9 and 10. As will be described below, microprocessor 760 is controlled using inputs from the keyboard 763 comprising the Up, Down and Favorite channel keys 704, 705 and 706. A power latch 764 which is coupled to the batteries in the compartment 707 via the Power On key 703 in the keyboard 763 is coupled to a voltage switching regulator 765. Regulator 765 generates 5 volts and provides 3.3 volts therefrom and is also coupled to a voltage multiplier for providing a 15 volt source. The microprocessor 760 is coupled by means of a serial bus 770 and a reference bus 771 to the synthesizers 746 and 772. Synthesizer 772 is further coupled by means of a loop amplifier 773 to the first local oscillator 728a.

The reference bus 771 is used by the microprocessor 760 to provide a 4 MHz reference signal to the synthesizers 746 and 772. The serial bus 770 is used by the microprocessor 760 to provide tuning data information, a second clock and an enable signal to the synthesizers 746 and 772.

With the transceiver 701 of the present invention a person can receive all of the TV channels (except cable channels) in his or her local area, an area approximately 50 miles in diameter, depending on local terrain, transmitter power, etc. The audio portion of the received channels can be rebroadcast over any FM car radio or other FM radio.

Figure 13:
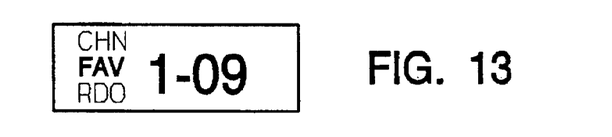
Figure 14:
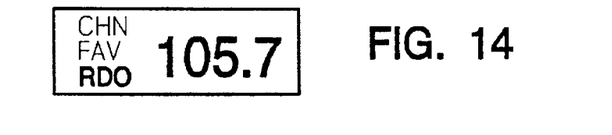

Referring to FIGS. 12, 13 and 14, to operate the transceiver 701 the power key 703 is depressed. When that occurs the display window 708 provides an alphanumeric display comprising three alpha symbols and up to four numerics. The three alpha symbols comprise CHN to represent the channel selected, FAV to represent the favorite channel selected and RDO to represent the FM radio station frequency selected.

Initially, when power is turned on, the transceiver 701 is placed in a normal mode of operation, the symbol CHN is highlighted and two numbers, e.g. 02, appear. The numbers indicate the TV channel that is selected. The transceiver 701 remembers the last channel selected when the power is turned off. If the channel selected is not the desired channel, either the Up channel key (+) 704 or the Down Channel key (−) 705 is depressed in one of three modes of operation: the Pulse mode, the Seek mode or the Race mode. In the Pulse mode, to increase or decrease the channel number by one, the Up Channel key 704 or the Down Channel key 705 is briefly depressed. In the Seek mode, to automatically find the next higher or lower TV channel, the Up Channel key 704 or the Down Channel key 705 is depressed for three seconds and released. The transceiver 701 will stop on the next operating channel as detected by the RSSI detector 776. In the Race mode, a distant channel number is quickly reached by depressing and holding either the Up Channel key 704 or the Down Channel key 705 while watching the display window 708. When the desired channel is near, the key is released and the Pulse mode is used to select the channel. The internal microprocessor is also programmed to speed up the change in channel numbers the longer the key remains depressed.

To select one of five previously stored favorite channels, the Favorite Channel key 706 is depressed to cycle through all of the favorite channels. When the desired channel is reached, the key is released.

In addition to the normal mode of operation described above, the transceiver 701 has two additional basic operating modes: a Favorite Channel programing mode (FAV) and a Radio broadcast frequency programming mode (RDO). In the CHN mode as described above, the display window 708 initially shows the currently selected TV channel as shown in FIG. 12. In this mode the Up and Down Channel keys 704, 705 are used to change channels. In the FAV mode, the display window 708 shows the location number, i.e. one of 5 possible numbers, 1, 2, 3, 4, or 5, and the favorite TV channel stored in that location as shown in FIG. 13. In the RDO mode, the display window 708 shows the FM frequency to which the FM radio must be tuned to enable listening to the audio on the selected TV channel as shown in FIG. 14.

To store up to five favorite channels, the Favorite Channel mode is entered by simultaneously depressing both the Down and Favorite Channel keys 705 and 706. The Favorite Channel key 706 is then depress to change the location of the stored favorite channel from 1 to 5. The Up and Down Channel keys 704 and 705 are then depressed until the desired channel, appears in the display window. At that point, the Favorite Channel key 706 is depressed to store the selected channel in the location indicated in the display window. Up to four additional channels may be selected in the same fashion. To store fewer than five favorite channels, Channel 0 is stored after the last favorite channel is stored in the manner described above. Pressing the Favorite Channel key 706 a second time returns the transceiver to its Normal operating mode.

To enter the RDO mode both the Up and Favorite Channel keys 704 and 706 are depressed simultaneously. When this is done, 88.7, a factory preset FM frequency in MHz, appears in the display window. If 88.7 MHz is a normally unused FM frequency, the Favorite Channel key 706 is briefly depressed, returning the transceiver 701 to its Normal mode of operation. If 88.7 MHz is a normally used FM frequency, another and normally unused FM frequency must be selected by depressing either the Up or Down Channel keys 704 and 705. When the desired frequency appears in the display window 708, the key is released. Thereafter, the Favorite Channel key 706 is depressed to return the transceiver 701 to its Normal operating mode.

Figure 15:
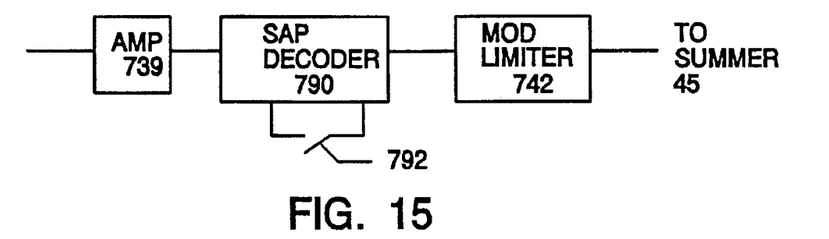
FIG. 15 is a block diagram of a modification of FIG. 11 for stereo signal reception and transmission.

Referring to FIG. 15, there is provided for use in a stereo embodiment of the present invention a stereo decoder designated generally as 780 and a stereo modulator designated generally as 781. Stereo decoder 780 and modulator 81 are provided for receiving and transmitting stereo signals.

Figure 16:
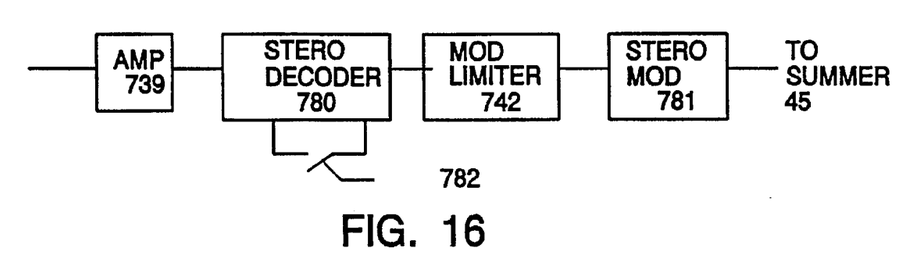
FIG. 16 is a block diagram of a modification of FIG. 11 for SAP signal reception and transmission.

Referring to FIG. 16, there is provided in still another embodiment of the present invention a secondary audio programming decoder 790. Decoder 790 is coupled between the amplifier 739 and the modulation limiter 742 as described above with respect to FIG. 11 for receiving and transmitting SAP signals.

Both stereo decoder and stereo modulator 780 and 781 and SAP decoder 790 are conventional circuits and may be included in the same integrated circuit chip and are shown separately only for convenience. Switch means 782 is provided for switching the stereo decoder on and off to provide either stereo or monaural audio signals to the transmitter section 713. Similarly, switch means 792 is provided to select between primary audio signal programming and secondary audio signal programming.

While different preferred embodiments of the present invention are described above, it is contemplated that modifications may be made to each embodiment of the features of any other embodiment and that modification may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

We claim:

1. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component, wherein said means for providing a signal having an intermediate frequency comprises:

a mixer;

a local oscillator; and means for digitally selecting the frequency of the local oscillator;

means coupled so said intermediate frequency providing means for providing a baseband signal comprising said audio component; and means in said housing which is coupled to said baseband signal providing means for transmitting a radio frequency carrier comprising said audio component.

2. An apparatus according to claim 1 wherein said means for digitally selecting the frequency of the local oscillator comprises;

a frequency synthesizer; and a programmed microprocessor for controlling the synthesizer.

3. An apparatus according to claim 2 wherein said means for digitally selecting the frequency of the local oscillator comprises:

means coupled to said microprocessor for selecting a desired TV channel; and means for displaying the channel selected.

4. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled to said intermediate frequency providing means for providing a baseband signal comprising said audio component wherein said means for providing a baseband signal comprises a quadrature FM detector; and means in said housing which is coupled to said baseband signal providing means for transmitting a radio frequency carrier comprising said audio component.

5. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component; and means in said housing which is coupled to said baseband signal providing means for transmitting a radio frequency carrier comprising said audio component wherein said means for transmitting a radio frequency carrier comprising said audio component comprises means for transmitting a FM radio frequency carrier comprising said audio component.

6. An apparatus according to claim 5 wherein said housing comprises a convex rear surface and a concave front surface.

7. An apparatus according to claim 5 wherein said antenna means comprises and extendable antenna means.

8. An apparatus according to claim 7 wherein said antenna means comprises a whip antenna approximately four inches long.

9. An apparatus according to claim 5 wherein said antenna matching means is adaptive to vary the characteristics of the impedance matching means as a function of a channel selected to be received by said apparatus.

10. An apparatus according to claim 5 wherein said selectable bandpass filtering means comprises:

a plurality of bandpass filtering means where one of said bandpass filters is selected as a function of which said VHF and UHF band is being selected.

11. An apparatus according to claim 5 wherein said means for transmitting a FM radio frequency carrier comprising said audio component comprises:

a local oscillator;

means for digitally selecting the nominal FM frequency of the local oscillator;

a summing circuit responsive to the audio component received from said baseband signal providing means and an output from the nominal FM frequency selecting means for modulating the frequency of the local oscillator relative to the nominal FM frequency and providing at the output of the local oscillator said FM radio frequency carrier comprising said audio component; and a transmitting antenna means coupled to said local oscillator for radiating the modulated FM carrier comprising said audio component.

12. An apparatus according to claim 11 wherein said transmitting antenna means comprises a loop antenna.

13. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled to said intermediate frequency providing means for providing a baseband signal comprising said audio component; and means in said housing which is coupled to said baseband signal providing means for transmitting a radio frequency carrier comprising said audio component wherein said means for transmitting a radio frequency carrier comprising said audio component comprises:

a local oscillator; and means for digitally selecting the nominal frequency of the local oscillator.

14. An apparatus according to claim 13 wherein said means for digitally selecting the nominal frequency of the local oscillator comprises;

a frequency synthesizer; and a programmed microprocessor for controlling the synthesizer.

15. An apparatus according to claim 14 wherein said means for digitally selecting the nominal frequency of the local oscillator comprises:

means coupled to said microprocessor for selecting a desired nominal frequency; and means for displaying the nominal frequency selected.

16. Apparatus for receiving via the airwaves and transmitting via the airwaves the audio component of a TV channel wherein said audio component comprises stereo audio components, said apparatus comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component wherein said baseband providing means comprises means for providing a baseband signal comprising said stereo components; and means in said housing which is coupled to said baseband signal providing means for transmitting a radio frequency carrier comprising said audio component wherein and said transmitting means comprises means for transmitting said stereo components.

17. Apparatus for receiving via the airwaves and transmitting via the airwaves the audio component of a TV channel wherein said audio component comprises a primary audio program component and a secondary audio program component (SAP), said apparatus comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component wherein said baseband providing means comprises means for selectively providing the primary audio program component and the secondary audio program component (SAP); and means in said housing which is coupled to said baseband signal providing means for transmitting a radio frequency carrier comprising said audio component wherein said transmitting means comprises means for transmitting said primary audio and secondary audio program components.

18. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time wherein said means for selecting one of said VHF and UHF bands at a time comprises:

an up channel key means;

a down channel key means;

a favorite channel key means for selecting a channel from among said VHF and UHF bands;

means for providing a normal mode of operation in which another channel is selected each time the up channel key means or the down channel key means is depressed;

means for providing a seek mode of operation in which the next operating channel is selected when either the up channel key means or the down channel key means is depressed for a predetermined period of time; and means for providing a race mode of operation in which succeeding channel numbers are presented for selection at an ever increasing rate of speed as a function of the time either the up channel key means or the down channel key means is depressed;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component;

means in said housing which is coupled to said baseband signal providing means for transmitting a radio frequency carrier comprising said audio component.

19. An apparatus according to claim 18 wherein said predetermined period of time comprises approximately three seconds.

20. Apparatus for receiving via the airwaves end transmitting via the airwaves the audio component of a TV channel comprising:

a housing;

antenna means in the housing for receiving two bands of VHF TV signals and a band of UHF TV signals;

means for selecting one of said VHF and UHF bands at a time wherein said means for selecting one of said VHF and UHF bands at a time comprises:

an up channel key means;

a down channel key means;

a favorite channel key means for selecting a channel from among said VHF and UHF bands;

means for storing a plurality of favorite channels wherein said means for storing a plurality of favorite channels comprises:

means responsive to the simultaneous depression of both the down channel key means and the favorite channel key means for placing the apparatus in a favorite channel programming mode of operation;

means responsive to either the depression of the up channel key means or the down channel key means when the apparatus is in its favorite channel programming mode of operation for selecting a channel; and means responsive to the depression of the favorite channel key means to store the selected channel and return the apparatus to its normal mode of operation;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component; and means in said housing which is coupled to said baseband signal providing means for transmitting a radio frequency carrier comprising said audio component.

21. Apparatus for receiving via the airwaves and transmitting via the airwaves the audio component of a TV channel comprising:

a housing;

antenna means in the housing for receiving two bands of VHF TV signals and a band of UHF TV signals;

means for selecting one of said VHF and UHF bands at a time;

antenna matching means coupled to the antenna means within the housing for matching the impedance of the antenna means to the impedance of the circuits to which the antenna means is connected;

selectable bandpass filtering means for filtering the output of the antenna matching network means in a selected one of the VHF and UHF bands;

means coupled to the bandpass filtering means for providing a signal having an intermediate frequency comprising said audio component;

means coupled so said intermediate frequency providing means for providing a baseband signal comprising said audio component;

means in said housing which is coupled to said baseband signal providing means for transmitting a radio frequency carrier comprising said audio component; and means for selecting the frequency of said radio frequency carrier wherein said means for selecting the frequency of said radio frequency carrier comprises:

an up channel key means;

a down channel key means;

a favorite channel key means; and means for storing a selected carrier frequency wherein said means for storing a selected carrier frequency comprises:

means responsive to the simultaneous depression of both the up channel key means and the favorite channel key means for placing the apparatus in a radio broadcast frequency programming mode of operation;

means responsive to either the depression of the up channel key means or the down channel key means when the apparatus is in its radio frequency programming mode of operation for selecting a frequency; and means responsive to the depression of the favorite channel key means to store the selected frequency and return the apparatus to its normal mode of operation.

* * * * *